Figure 1:
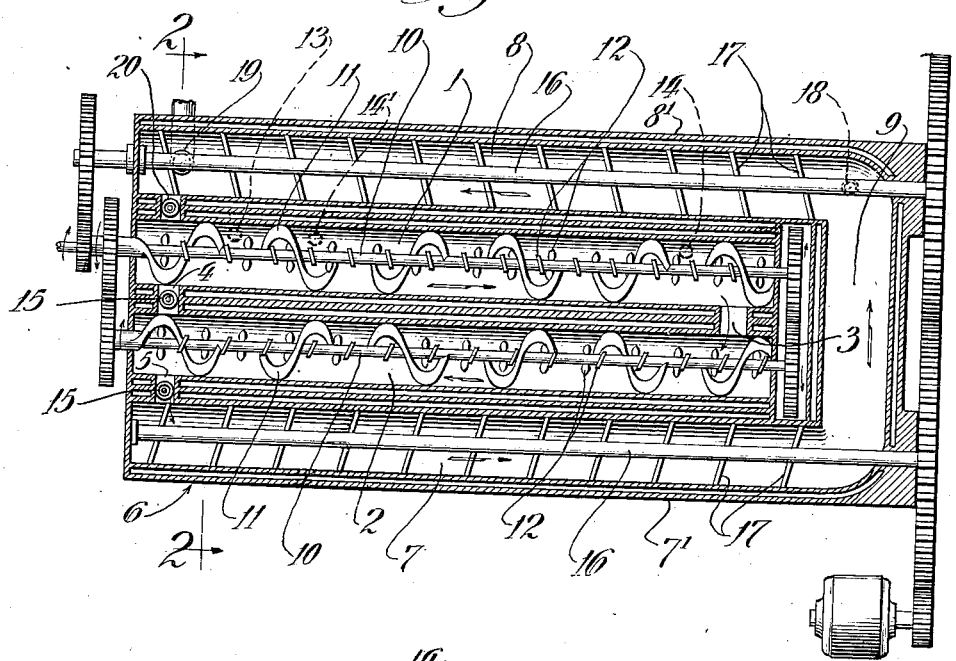

July 4, 1933.  L. KIRSCHBRAUN  1,916,885

PROCESS AND APPARATUS FOR PRODUCING EMULSIONS

Original Filed March 14, 1929

Witness:
Stephen A. Rebora

Inventor:
Lester Kirschbraun,
By Frank L. Belknap
Attorney.

Patented July 4, 1933

1,916,885

UNITED STATES PATENT OFFICE

LESTER KIRSCHBRAUN, OF LEONIA, NEW JERSEY, ASSIGNOR, BY MESNE ASSIGNMENTS, TO THE FLINTKOTE CORPORATION, OF BOSTON, MASSACHUSETTS, A CORPORATION OF MASSACHUSETTS

PROCESS AND APPARATUS FOR PRODUCING EMULSIONS

Continuation of application Serial No. 346,872, filed March 14, 1929. This application filed December 20, 1930. Serial No. 503,850.

This application is a continuation of my co-pending application Serial No. 346,872, filed March 14th, 1929.

The present invention relates to improvements in the manufacture of emulsions, and has for its principal object to provide for an economical and highly efficient continuous emulsifying and beating operation.

The improvements of the present invention are applicable particularly to aqueous emulsions or dispersions of normally solid or semi-solid bitumens, such as asphalt and the like, but in its broad aspects the invention is applicable to the production of aqueous dispersions of all substances of analogous nature normally immiscible with water.

Aqueous dispersions of materials of this general group have been known for some time, and extensive quantities are being produced commercially at the present time in accordance with certain of the better known and more practical methods available in the art.

According to one method, a bulk supply of finished emulsion is maintained in an emulsifier. Emulsifying agent, water and water-immiscible substance to be dispersed are introduced to the emulsifier, being agitated and intimately intermingled therein, undergoing emulsification and co-mingling with the bulk supply. Regulated quantities of finished emulsion from the bulk supply are intermittently or continuously withdrawn. Under usual conditions of emulsification, the withdrawn product is generally of a paste-like consistency, that is, its viscosity is high.

There are a number of commercial reasons for controlling the conditions of emulsification so as to maintain a relatively high viscosity in the emulsifier, one of the important reasons being that it has been found that the maintenance of a high viscosity during emulsification results in a desirable fine degree of dispersion. Another obvious reason is that viscosity is in direct proportion to the amount of water contained in the emulsion being withdrawn from the emulsifier, and the aim is to operate in such a way that the product being withdrawn from the emulsifier contains a minimum amount of water.

In application for commercial use, according to one method, said viscous emulsion can be readily diluted and thinned with water because of the fact that the water is in the external phase. According to another method, the viscous emulsion of paste-like consistency may be subjected to a controlled beating or whipping action which it has been found materially increases the fluidity of the emulsion without the use of that amount of water normally required for such decrease in viscosity. This latter method is known as beating and is in extensive commercial use today.

It is a principal object of the present invention to combine the emulsifying and beating operations and other steps necessary for the production of a satisfactory dispersion in a continuous process and to construct apparatus carefully designed for efficient and economical operation.

Another object of the invention is to provide an operation in which the ingredients may be mixed without particular regard to the particle size resulting from the initial agitating action, but which can be reduced where required to the desired particle size range by passing the ingredients through a secondary zone where a greater intensity of agitation prevails, or through agitating zones of progressively increasing intensity.

According to the process of the invention, emulsification preferably continuously proceeds in the emulsifier in the presence of a bulk supply of end product. Regulated quantities of the relatively thick and highly viscous end product as withdrawn from the emulsifier are subjected to a controlled and progressive beating operation for progressively thinning the same to a viscosity substantially below the normal emulsifying viscosity obtaining in the emulsifying zone, and, as one of the features of the process, regulated amounts of thinned emulsion are returned from the beating zone to the emulsifying zone with advantages hereinafter more particularly brought out.

The apparatus of the present invention comprises in combination an emulsifier, a beater (zone of more intense agitating action than prevails in the emulsifier) and valved communications between the emulsifier and beater, one for transferring end product from the emulsifier to the beater and the other for returning controlled amounts of thinned emulsion to the emulsifier.

By means of the process and apparatus herein described and claimed, I am enabled to produce a maximum quantity of finished emulsion of desired fluidity with a minimum water content by means of a relatively small compact apparatus, continuous daily production in large volume being recognized commercially as the basis of economical operation.

Further utility of the invention as well as numerous other objects and advantages will be brought out in the following description.

In the drawing, Fig. 1 is a diagrammatic top plan view of the apparatus of the present invention.

Figure 2:
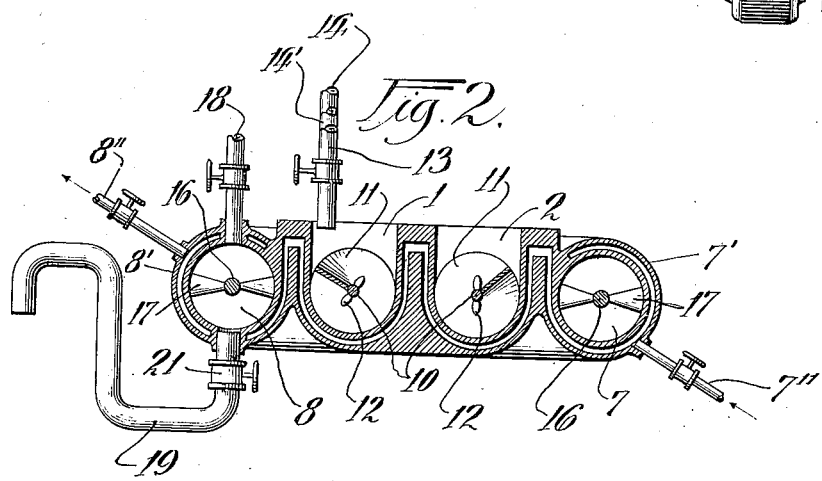

Fig. 2 is a vertical sectional view taken on line 2—2 of Fig. 1.

Referring more particularly to the drawing, the apparatus may comprise a pair of adjoining horizontally disposed elongated passageways 1 and 2 of restricted cross section connected with each other at both ends by communicating ducts 3 and 4 to permit cyclic circulation of material between the two passageways. Passageway 2 is connected by means of channel 5 with a closed conduit, designated as a whole at 6, which conduit according to the present invention takes the form of a U comprising parallel conduits 7 and 8 connected by the U bend 9. Preferably, parallel conduits 7 and 8 have free communication with each other through the medium of the open U bend 9.

Within the passageways 1 and 2 there are disposed fixed longitudinal shafts 10 mounted to rotate at a speed of 70 to 90 R. P. M., more or less, on which shafts are mounted helicoidal blades 11, preferably serrated or with broken flights, and small paddles 12. As illustrated by arrows the helicoidal blades in one passageway are pitched so as to force the material in one direction while the helicoidal blades in the other passageway are pitched to force the material in the opposite direction. The small paddles 10 on each of the shafts may be pitched so as to force the material in the same, or in a more or less countercurrent, direction to that produced by the effect of the corresponding helicoidal blades.

The emulsifying agent, which may comprise clay, bentonite, mineral pigments, colloidal oxides and hydroxides, silicates or other emulsifying media, may be introduced near one end of the passageway 1, as for example, through a feed pipe 13. As introduced to passageway 1, the emulsifying media may be in the form of either a thin aqueous suspension or a heavy aqueous paste, or may be introduced in dry condition, in which event water would be introduced through another feed pipe (not shown).

The emulsifying media is forced along by the blades 11 in the passageway 1; the water-immiscible material to be dispersed may be fed into the passageway 1 through either or both of the feed pipes 14 or 14′. Where portions of the finished end product are being recycled to the passageway 1, as more particularly described hereinafter, it is preferable to introduce the bitumen through the feed pipe 14 in order to permit the recycled material to become admixed with freshly added emulsifying media. This feed line 14 may also be used where the emulsifying agent and water are separately introduced in order to allow the emulsifying agent to be formed into a suspension of desired consistency before coming into contact with the bitumen. Where the operation is being conducted without recycling portions of the finished end product and/or where a prepared suspension of emulsifying agent is introduced through the feed line 13, the bitumen will preferably be fed in through the feed pipe 14′. The action of the helicoidal blades 11 and the small propeller blades 12 in passageway 1 will serve to produce a mixing of the materials introduced, plus a forward moving action through the trough 1 and then through the connection 3 into the adjacent parallel trough 2, the material being emulsified during its movement through these passageways.

At the end of passageway 2, part of the emulsion may be discharged through the connecting conduit 4 to be recirculated through conduit 1, or part or all of the emulsion may be discharged through the connecting channel 5 into the beating conduit 7, by obvious manipulation of the valves 15.

Conduit 7 is provided with a shaft 16 upon which are mounted a series of propellers or paddles 17 adapted to revolve preferably at a higher rate of speed than the shafts 10 so as to produce a more intense agitating effect than prevails in the passageways 1 and 2. For instance, the speed of the shaft 16 may conveniently be around 150 to 200 R. P. M., the propeller blades 17 forcing the emulsion along in conduit 7 in the direction of the arrows, discharging same into the conduit 9 connecting passageway 7 with passageway 8 where the material may be subjected to a still more intense agitating effect.

Conduit 8 is provided with a shaft 16 and propellers 17 similar to the shaft and propellers in conduit 7, but adapted to force the material along in a direction countercurrent to the direction of flow in conduit 7, as illustrated by the arrows. Preferably, the shaft 16 in conduit 8 is geared to rotate at a much higher speed relative to the shaft 16 in conduit 7, as for example, 325 to 375 R. P. M., whereby to effect a more intense agitating action.

Any modifying agent, such, for instance, as chromate, material for pH adjustment, or any other type of modifying agent may be added to the emulsion, as for example, prior to the final stage of agitation, through conduit 18. The finished material may be withdrawn from conduit 8 through outlet 19.

As a feature of the present invention, regulated amounts of the finely thinned material may be diverted from conduit 8 and outlet 19 and returned through connecting channel 20 to the first emulsifying trough 1, where it can be brought to desired consistency by mixture with the emulsifying agent introduced at 13, or with emulsion recirculated from trough 2 through communicating duct 4, or both. A valve 21 is interposed in the draw-off pipe 19 for controlling the withdrawal of finished emulsion from the conduit 8. By regulating the height of the overflow through draw-off 19 finished material can be drawn off at the desired rate.

The conduits 1, 2, 7 and 8 are preferably jacketed, as shown in the drawing, to provide for the introducing of a temperature regulating medium. In conduits 7 and 8 it is frequently found necessary to cool the material because considerable heat is developed by friction which must be dissipated more rapidly than is possible through the action of the surrounding atmosphere in order to secure the best results, and therefore, cooling liquid is applied to the jackets 7' and 8' through valved inlet 7" and withdrawn through valved outlet 8".

To produce an emulsion of minimum water content, it is important to cool the material in the zones of higher agitation as much and as quickly as possible, for the more quickly the temperature is reduced during the thinning stage, the lower is the water content for a given consistency. In general, during the stage in which the particle size is being reduced, the temperature should be maintained close to the melting point of the bitumen being emulsified, but when the desired particle size has been obtained, the temperature should be dropped as quickly as possible and to as low a degree as the cooling medium permits, the effluent material being preferably approximately 70° F.

There are many advantages in returning regulated amounts of the cooled, thinned final product from conduit 8 to the initial emulsifying trough 1, for instance, this affords a means of more accurately controlling the operation and having it run more smoothly. Also, by thus returning some of the finished material, the emulsion can be made with a water content much lower than is otherwise possible. The relative quantities of final product returned from conduit 8 to conduit 1 will depend entirely upon the material being dispersed, the speed of rotation of the different shafts, the absence or inclusion of modifying agents, and on many other variable factors, but all of these will be within the purview of those skilled in this art. I have found in average operation that bleeding approximately 25% of thinned final product from the final trough 8 to the initial trough 1 beneficially assists the operation, but I do not wish to be limited in any way to any definite amount.

The method and apparatus herein described is designed to produce emulsion continuously and subject the emulsion, after the particles have been brought into an initial state of subdivision, to a beating action for reducing the viscosity of the emulsion as formed, or for producing further subdivision of the particles in the zones of more intense agitation, and, as a feature of the invention, the process and apparatus is designed to return to the emulsifying zone regulated quantities of the cooled, thinned finished product, whereby emulsions of minimum water content for a given consistency may be economically produced. Thus, for example, where bentonite is used as an emusifying agent without carrying the material through agitating zones of successively increasing intensity, the water content of the emulsion having a spreading consistency, is generally about 45%, but by means of the aforesaid feature of my invention, an emulsion of the same degree of fluidity and corresponding particle size may be produced with a water content of only 36 to 38%. Furthermore, by cooling quickly the material passing through the zones of higher intensity of agitation, the water content may be still further reduced to about 30 to 32%, especially where portions of the finished material are recycled as described, to the zone of initial emulsification.

I claim as my invention:

1. A process which comprises mixing and agitating water-immiscible material with water to produce a dispersion in which the water-immiscible material constitutes the internal phase and the water the external phase, subjecting said dispersion to a more intense agitating action, and thereafter combining regulated portions of finished emulsion with the materials being mixed and agitated in the initial dispersing stage.

2. A process which comprises mixing and agitating water-immiscible material with water to produce a dispersion in which the water-immiscible material constitutes the internal phase and the water the external phase, subjecting said dispersion to a more intense agitating action, thereafter combining regulated portions of finished emulsion with the materials being mixed and agitated in the initial dispersing stage and introducing to the initial dispersing stage regulated amounts of fresh materials to be mixed and agitated to produce dispersion.

3. An apparatus comprising an emulsifier wherein materials are mixed and agitated to produce a dispersion in which water-immiscible material constitutes the internal phase and water constitutes the external phase, a beater wherein said dispersion is subjected to a more intense agitating action, a valved communication between the emulsifier and said beater for discharging emulsion from the emulsifier to the beater, and a valve controlled communication between the beater and emulsifier for returning regulated amounts of thinned dispersion to said emulsifier.

4. An apparatus comprising an emulsifier wherein materials are mixed and agitated to produce a dispersion of paste-like consistency in which water-immiscible material constitutes the internal phase and water constitutes the external phase, a beater wherein said dispersion of paste-like consistency is subjected to beating or whipping action to increase the fluidity thereof, a valved communication between the emulsifier and said beater for discharging emulsion from the emulsifier to the beater, a valve controlled communication between the beater and emulsifier for returning regulated amounts of thinned dispersion to said emulsifier, means for charging fresh materials to be mixed and agitated to said emulsifier, and a valved outlet from said beater for withdrawing the thinned final product.

5. A process which comprises mixing and agitating water-immiscible material with water to produce a dispersion of paste-like consistency in which the water-immiscible material constitutes the internal phase and the water the external phase, subjecting said dispersion of paste-like consistency to a beating or whipping action to render same more fluid, and thereafter returning regulated portions of said thinned dispersion to the zone where the initial dispersion of paste-like consistency is produced.

6. A process which comprises commingling heat liquefied bitumen with a mixture of water and emulsifying agent, agitating the commingled mass to effect emulsification of the bitumen, subjecting the emulsion thus produced to agitation under conditions to progressively decrease the viscosity thereof to below the normal emulsifying viscosity of the bitumen and lowering the temperature of the mass rapidly during said last named agitation.

7. A continuous process which comprises commingling heat liquefied bitumen with a mixture of water and emulsifying agent, agitating the commingled mass to effect emulsification of the bitumen while maintaining the temperature of the mass substantially at the melting point of the bitumen, subjecting the emulsion thus produced to agitation under conditions to progressively decrease the viscosity thereof below the normal emulsifying viscosity of the bitumen and lowering the temperature of the mass rapidly during said last named agitation to a temperature substantially below the melting point of the bitumen.

8. A process which comprises commingling heat liquefied bitumen with a mixture of water and emulsifying agent, agitating the commingled mass to effect emulsification of the bitumen, passing the emulsion thus produced through agitating zones of progressively increasing intensity to cause a progressive decrease in viscosity of the emulsion, while simultaneously rapidly decreasing the temperature of the emulsion to substantially below the melting point of the bitumen and withdrawing the emulsion of reduced viscosity from the last named zone.

9. A continuous process which comprises commingling and agitating heat liquefied bitumen with a mixture of water and emulsifying agent to form an emulsion, passing the emulsion thus formed through a zone, separate and distinct from the emulsifying zone, where it is subjected to intense agitation for reduction in viscosity thereof to below the normal emulsifying viscosity of the bitumen, rapidly and substantially cooling the emulsion during said last named agitation and withdrawing the finished product from said last named zone.

10. A continuous process which comprises commingling heat liquefied bitumen with a mixture of water and emulsifying agent, passing the commingled mass through agitating zones of progressively increasing intensity and rapidly decreasing the temperature of the material during its passage through the zones of greater intensity of agitation.

11. A continuous process which comprises commingling and agitating heat liquefied bitumen with a mixture of water and emulsifying agent to form an emulsion, passing the emulsion thus formed through a zone where it is subjected to intense agitation while being rapidly and substantially cooled, and withdrawing the finished product from said last named zone.

In testimony whereof I affix my signature.

LESTER KIRSCHBRAUN.